May 31, 1927.

C. S. BRAGG ET AL 1,630,327

VALVE CONTROL MECHANISM FOR POWER ACTUATORS

Original Filed April 3, 1925

Caleb S. Bragg
Victor W. Kliesrath
INVENTORS
BY
Louis Prevost Whitaker
ATTORNEY

Patented May 31, 1927.

1,630,327

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

VALVE-CONTROL MECHANISM FOR POWER ACTUATORS.

Original application filed April 3, 1925, Serial No. 20,333. Divided and this application filed July 3, 1926. Serial No. 120,420.

Our invention consists in the novel features hereinafter described, reference being had to the accompanying drawing, which illustrates one embodiment of the same, and a slight modification thereof, selected by us for purposes of illustration, and the said invention is fully disclosed in the following description and claims.

This application is a division of our former application for Letters Patent of the United States, filed April 3, 1925, and given Serial No. 20,333.

Our invention consists in improved controlling valve mechanism for power actuators, and is especially adapted for use in connection with automotive vehicles in which the brakes may be applied by means of a power actuator, operated either by suction from a suction passage of the engine, as from the intake manifold, or by pressure, as by a connection from an engine cylinder. According to our invention, a pivoted brake lever is employed which is preferably operatively connected with the piston of a power actuator, which in turn, is connected in any usual or desired manner, with the brake mechanism of the vehicle, and the brake lever is provided with a movable foot engaging portion, or pedal, preferably having a rocking motion with respect to the pedal lever, the valve mechanism for controlling the movements of the actuator being so constructed and arranged with respect to the movable pedal, that the movement of the pedal with respect to the pedal lever, effects the operation of the control valve mechanism for the actuator. When the pedal lever and pedal are in the off or at rest position, the valve mechanism will be normally maintained in such position that the brakes are entirely off, and the piston of the actuator is in its retracted position. The movement of the pedal with respect to the lever in one direction, by the foot of the operator, will operate the valve mechanism so as to apply the brake mechanism, and we prefer to provide a retracting spring for the pedal for restoring it to normal position. We also prefer to support the pedal in its normal or off position, so that the engagement of the operator's foot with the pedal will tend to shift the pedal with respect to the lever and actuate the valve mechanism so as to apply the brakes. The pedal lever is also preferably so supported that it will move downwardly and forwardly as the brakes are applied, and thereby tend to rock the pedal in a reverse direction, if the operator does not change the position of his foot, that is to say, if he does not continuously depress the toe of his foot more and more during the downward movement of the pedal so that if the operator desires to keep the pedal in a position to continue the operation of the actuator, it will require a conscious movement on his part to effect this result. As the pedal lever is connected to the piston of the actuator, it will move with the actuator piston when the valve mechanism has been operated by the relative movement of the pedal with respect to the lever. It also follows from this construction that the operator can add his physical power to the power of the actuator, and that in case of failure of power, the operator can, by his own physical power, apply the brakes in the usual manner, by depressing the pedal lever, the rocking of the pedal in such case serving to vent the actuator cylinder.

In the accompanying drawings, which illustrate the invention,

Figure 1:
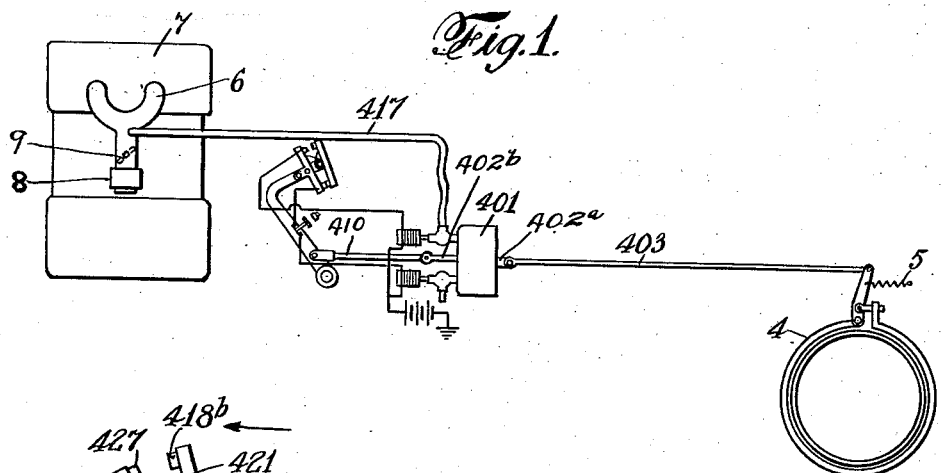
Fig. 1 is a diagrammatic view representing the application of our invention to a vacuum brake system for automotive vehicles.
Figure 2:
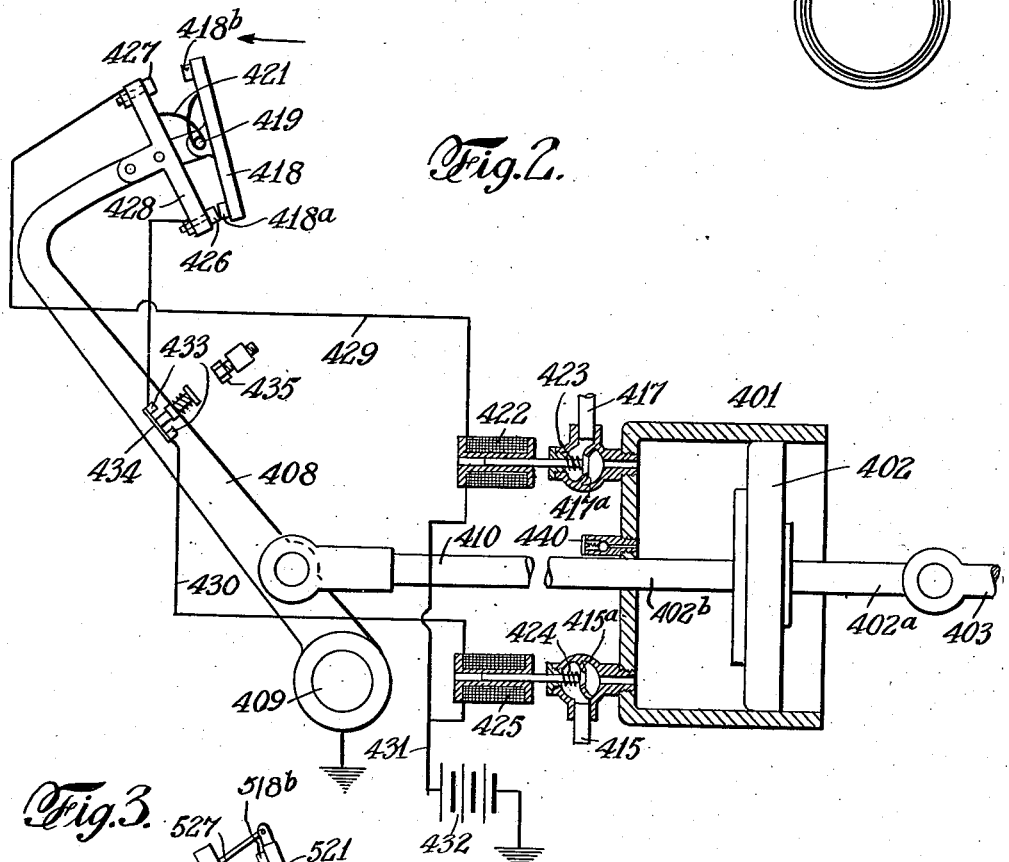
Fig. 2 is an enlarged detail view of the pedal lever and pedal, the actuator cylinder and piston, the valve mechanism therefor, and electrical connections between the pedal and the valve mechanism for controlling the same.

Referring to the form of our invention shown in Figs. 1 and 2, 401, represents the cylinder of a power actuator provided in this instance with a single acting piston, indicated at 402, having a piston rod, 402ª, connected by a link 403, with the brake mechanism of the vehicle, diagrammatically illustrated at 4, which may be of any usual or desired form, and is provided with retracting means, which may be in the form of a spring brake band or a retracting spring, 5, operatively connected with the brake actuating lever, as shown, or other connections. The actuator cylinder, 401, is connected with suitable means for providing differential pressures on opposite faces of the piston. In this instance we have shown the actuator adapted to be operated by suction from a suction passage of the engine, from the carburetor, 8, between the throttle valve, 9, and the cylinders, as the intake manifold, 6, of the internal combustion engine, 7, suitable controlling valve mechanism being interposed between the actuator cylinder, 401, and the manifold. In the form of our invention which constitutes the subject matter of this application, the control of the valve mechanism is effected by electro-magnetic means. In these figures, 408, represents the pedal lever, pivoted at 409, and connected by link rod, 410, with a piston rod, 402$^b$, connected with the piston, 402, of the actuator. In this instance the cylinder, 401, is provided with a pipe or passage, 417, for connecting it with the intake manifold, or other source of suction, said passage being controlled by a valve, 417$^a$. The cylinder is also provided with a vent passage, 415, which is controlled by a separate valve, 415$^a$. The suction valve, 417$^a$, is provided with an electro-magnetic device, 422, for opening the same, said valve being normally held in closed position by a suitable spring, 423. The valve, 415$^a$, is normally held closed by a spring, 424, and is adapted to be opened by an electro-magnetic device, indicated at 425. Any known or desired form of electric magnetic device may be employed for operating the valve, and the particular form of such electromagnetic device forms no part of our invention. For example, we may use ordinary electromagnets operating movable armatures, or we may employ solenoids operating longitudinally movable cores, or any other form of electromagnetic device which may be desirable.

In this instance we have shown the pedal lever, 408, provided with a pedal, 418, pivoted at 419, and provided with a retracting spring, 421. The pedal is, in this instance, provided with contacts, 418$^a$ and 418$^b$, for engaging, respectively, contacts, 426 and 427, insulated from each other and the lever, and carried by a plate, 428, secured to the lever, 408. The contact, 427, is shown as connected by a wire, 429, with the electromagnetic device, 422, for controlling the suction valve, 417$^a$, and the contact, 426, is shown as connected by wire, 430, with the electromagnetic device, 425, for controlling the vent valve, 415$^a$. Said electromagnets, or other electric devices, are connected by a wire, 431, with a battery, 432, or other source of electric power, which is in turn connected with a ground, as indicated, for example, to a portion of the chassis to which the pedal lever, 408, is connected, so that the pedal is also grounded at this connection with the pedal lever. The spring, 421, normally holds the pedal, 418, in position with the contact, 418$^a$, in engagement with the contact, 426, closing the circuit through the electromagnetic device, 425, and tending to hold the vent valve in open position. In order to prevent the running down of the battery, or other unnecessary use of electric current when the parts are at rest, we prefer to provide means for automatically breaking the circuit through the contact, 426, when the lever, 408, is in its normal or "off" position. For this purpose, we have shown, in Fig. 2, a cutout switch on the pedal lever, comprising the fixed contacts, 433, insulated from lever 408 and a movable switch member, 434, normally held in closed position by a spring, a stationary adjustable stop, indicated at 435, being provided on the frame of the vehicle, in position to be engaged by the movable switch member, 434, as the pedal lever returns to its normal or off position, thus separating it from the contacts, 433, and breaking the circuit through the electromagnetic device, 425. The pedal, 418, is so placed that when the operator places his foot upon it, as before stated, pressure of his foot will move the lever, 408, away from the stop, 435, thus restoring the contact switch member, 434, to its engagement with the contacts, 433, and tending to shift the pedal in the direction of the arrow in Fig. 2, and bringing the contact, 418$^b$, into engagement with the contact, 427, energizing the electromagnetic device, 422, and opening the suction valve, 417$^a$. The piston will immediately move forward in a direction to apply the brake mechanism. When the brakes have been applied sufficiently, the operator may, by rocking the pedal in the opposite direction from that indicated by the arrow in Fig. 2, bring it into such a position that neither of the electric circuits are closed, thus permitting the suction valve, 417$^a$, and vent valve, 415$^a$, to remain closed under the action of their respective springs, and holding the brake mechanism. If the operator rocks the pedal, 418, backward, so as to bring the contact, 418$^a$, into engagement with the contact, 426, the circuit will be closed through the electromagnetic device, 425, and the vent valve opened. This permits air to enter the cylinder to equalize pressures on opposite faces of the piston permitting the retraction of the piston and the relief of the brake mechanism, by the load of the brakes and the retracting springs therefor, as the spring 5, Fig. 1, and restoring the pedal lever, 408, to its normal position, at which time the cut out switch, 434, will engage the stop, 435, and break the circuit through the electromagnetic devices controlling the vent valve, permitting it to seat under the action of its spring.

The cylinder is also provided with a safety valve, indicated at 440, normally held closed by a spring, but capable of opening to vent the cylinder in case the brakes are applied by the physical force of the operator in the event of the failure of the electric circuit to open the valves and vent the cylinder.

Figure 3:
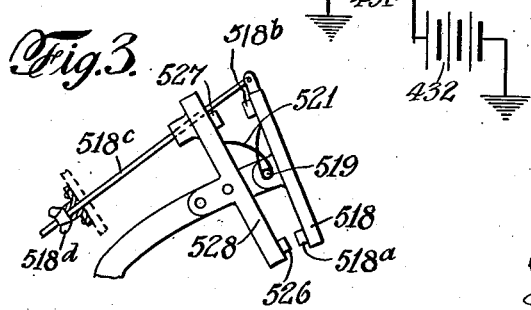
Fig. 3 is a detail view showing a slight modification of the pedal illustrated in Fig. 2.

Instead of using the cut out switch illustrated in Fig. 2, we may provide the pedal with a stop rod, as illustrated in Fig. 3, in which the pedal is indicated at 518, provided with the contacts, 518ª and 518ᵇ, and the pedal stop rod extending through an aperture in the floor board, as indicated at 518ᶜ, the rod being provided with an adjustable nut, 518ᵈ. The nut is adjusted so that when the pedal lever, 508, returns to normal or off position, the stop rod will raise the pedal in position to break the circuit through the contact, 518ª, thus accomplishing the same result that is accomplished by the circuit breaker shown in Fig. 2. As soon as the pedal lever is depressed, the pedal will be released from the restraint of the stop rod and either of the contacts, 518ª or 518ᵇ, can be brought into action.

When the operator places his foot on the pedal, and automatically rocks it so as to bring the contacts, 418ᵇ and 427 (Fig. 2) or 518ᵇ and 527 (Fig. 3) into engagement, and opens the suction valve so as to apply the brake, the pedal lever, as will be seen, will move downwardly and forwardly under the action of the power actuator, and if the operator does not change the position of his foot, the pedal will be automatically rocked in a reverse direction, as the pedal lever descends, which would tend to break the circuit through the suction valve actuating mechanism and stop the further movement of the actuator piston. We prefer to arrange the pedal so that this result will follow, as it will then require a conscious and continued depression of the toe of the operator to keep the contacts, 418ᵇ and 427, together, and will prevent the too sudden application of the brakes, which might result.

What we claim and desire to secure by Letters Patent is:—

1. In an automotive vehicle, the combination with brake mechanism, of a power actuator comprising a cylinder, a piston therein, and means for establishing differential pressures on opposite faces of the piston including controlling valve mechanism, and connections between said piston and the brake mechanism, a pivoted brake lever, operative connections between said lever and the brake mechanism, a pedal pivotally connected with said lever and movable with respect thereto, and operative connections between the pedal lever and said controlling valve mechanism, including electro-magnetic devices and controlling means therefor operated by the relative movement of the pedal with respect to the brake lever, whereby said brake mechanism can be operated by the physical force of the operator, or by said actuator, or by both.

2. In an automotive vehicle, the combination with brake mechanism, of a power actuator comprising a cylinder, a piston therein, and means for establishing differential pressures on opposite faces of the piston including controlling valve mechanism, and connections between said piston and the brake mechanism, a pivoted brake lever, operative connections between said lever and the brake mechanism, a pedal pivotally connected with said lever and movable with respect thereto, electro-magnetic devices for operating said valve mechanism, electric connections for controlling said electro-magnetic devices, including contacts carried by said pedal and pedal lever whereby said brake mechanism can be operated to the desired extent entirely by the physical force of the operator applied to the pedal and lever, or by the power of the actuator, by relative movement of the pedal, or by both of said means, under the control of the foot of the operator on said pedal.

3. In an automotive vehicle, the combination with brake mechanism, of a power actuator comprising a cylinder, a piston therein and means for establishing differential pressures on opposite faces of the piston including controlling valve mechanism, and connections between said piston and the brake mechanism, a pivoted brake lever, a pedal pivotally connected with said lever, and movable with respect thereto, operative connections between said lever and the piston of the actuator, electro-magnetic devices for operating said controlling valve mechanism, and electric connections for said electro-magnetic devices, including contacts on the pedal and contacts on the pedal lever for operating the valve mechanism by relative movement of the pedal with respect to the pedal lever, whereby the operator may operate the brake mechanism by his physical force alone, or by the actuator, or by both, under the control of his foot applied to said pedal.

4. In an automotive vehicle, the combination with brake mechanism, of a power actuator comprising a cylinder, a piston therein, and means for establishing differential pressures on opposite faces of the piston including controlling valve mechanism, and connections between said piston and the brake mechanism, a pivoted brake lever, operative connections between said lever and the brake mechanism, a pedal pivotally connected with said lever, and movable with respect thereto, and operative connections between the pedal lever and said controlling valve mechanism including electro-magnetic devices and controlling means therefor operated by the relative movement of the pedal with respect to the brake lever, and yielding means normally holding the pedal in position with respect to the pedal lever and said controlling means for said electro-magnetic devices, to allow the piston and brake mechanism to be returned to off position.

5. In an automotive vehicle, the combination with brake mechanism, a power actuator comprising a cylinder, and a piston operatively connected with the brake mechanism, means for establishing differential pressures on opposite faces of the piston, including controlling valve mechanism, of a pivoted pedal lever, operative connections between the pedal lever and the brake mechanism, a pedal pivotally connected with said lever, operative connections between the pedal and said controlling valve mechanism, operated by the relative movement of the pedal with respect to the pedal lever, including electro-magnetic devices for operating said controlling valve mechanism, and electric connections for controlling said electro-magnetic devices, including contacts operatively connected with the said pedal, and means for placing said electric connections out of operative condition when the pedal lever is in normal or off position.

6. In an automotive vehicle, the combination with brake mechanism, a power actuator comprising a cylinder, and a piston operatively connected with the brake mechanism, means for establishing differential pressures on opposite faces of the piston, including controlling valve mechanism, of a pivoted pedal lever, operative connections between the pedal lever and the brake mechanism, a pedal pivotally connected with said lever, operative connections between the pedal and said controlling valve mechanism, operated by the relative movement of the pedal with respect to the pedal lever, including electro-magnetic devices for operating said controlling valve mechanism, and electric connections for controlling said electro-magnetic devices, including contacts operatively connected with the said pedal, a spring for holding the pedal in position to close contacts operative to allow the return of the piston and brake mechanism, to off position, and means for placing said electric connections out of operative condition when the pedal lever is in normal position.

7. In an automotive vehicle, the combination with brake mechanism, a power actuator comprising a cylinder, and a piston operatively connected with the brake mechanism, and means for establishing differential pressures on opposite faces of the piston, including controlling valve mechanism, of a pivoted pedal lever, a pedal movably connected with said lever, electro-magnetic devices for operating said controlling valve mechanism, and electric connections for controlling said electro-magnetic devices, including contacts operatively connected with said pedal, operative connections between the pedal lever and said piston, yielding means for retracting said pedal, means for retracting the pedal lever, a stop in the path of the pedal lever for arresting the lever in normal or off position, said stop and the pedal lever being provided, the one with a cut out switch for breaking said electrical connection to prevent the waste of electrical energy, and the other with a part for operating said switch.

8. In an automotive vehicle, the combination with brake mechanism, a power actuator comprising a cylinder, and a piston operatively connected with the brake mechanism, and means for establishing differential pressures on opposite faces of the piston, including controlling valve mechanism, of a pivoted pedal lever, operative connections between said lever and the brake mechanism, a pedal movably connected to said lever and provided with electric contacts, coacting contacts carried by said lever, electro-magnetic devices for operating said controlling valve mechanism, electric circuits for said electro-magnetic devices, including said contacts, a cut out switch for said circuits carried by said lever, and a stop in the path of the said lever when it is returned to normal or off position for actuating the said cut out switch.

9. In an automotive vehicle, the combination with brake mechanism, a power actuator comprising a cylinder, and a piston operatively connected with the brake mechanism, and means for establishing differential pressures on opposite faces of the piston, including controlling valve mechanism, of a pivoted pedal lever, a pedal movably connected to said lever and provided with electric contacts, coating contacts carried by said lever, electro-magnetic devices for operating said controlling valve mechanism, electric circuits for said electro-magnetic devices, including said contacts, operative connections between the piston and the pedal lever for enabling the operator to apply the brakes by physical force, and a safety valve for venting the cylinder in case of failure of the electro-magnetic devices to properly control said valve mechanism.

10. In an automotive vehicle, the combination with brake mechanism, a power actuator comprising a cylinder, and a piston operatively connected with the brake mechanism, and means for establishing differential pressures on opposite faces of the piston, including controlling valve mechanism, of a pivoted pedal lever, a pedal movably connected to said lever and provided with electric contacts, coacting contacts carried by said lever, electro-magnetic devices for operating said controlling valve mechanism, electric circuits for said electro-magnetic devices, including said contacts, operative connections between the piston and the pedal lever for enabling the operator to apply the brakes by physical force, and a safety valve for venting the cylinder in case of failure of the electro-magnetic devices to properly control said valve mechanism, and means for placing the circuits through both of the pedal contacts out of operative condition when the pedal lever and piston are in normal or off position.

11. In an automotive vehicle, provided with an internal combustion engine for propelling it, having a suction passage for explosive charges from the carburetor between the throttle valve and the cylinders thereof, and brake mechanism for the vehicle, the combination of a power actuator comprising a cylinder and a piston therein, means for connecting said actuator with said suction passage and with the atmosphere to establish differential pressures on opposite faces of the piston, including controlling valve mechanism, electro-magnetic devices for operating said valve mechanism, means for connecting the actuator piston with the brake mechanism of the vehicle, a pivoted pedal lever, operatively connected with the brake mechanism of the vehicle, a pedal mounted on said lever for operating the same and movable relatively with respect to the lever, and electric connections between the said pedal and said electro-magnetic devices operable by the relative movement of the pedal with respect to said lever.

12. In an automotive vehicle, provided with an internal combustion engine for propelling it, having a suction passage for explosive charges from the carburetor between the throttle valve and the cylinders thereof, and brake mechanism for the vehicle, the combination of a power actuator comprising a cylinder and a piston therein, means for connecting said actuator with said suction passage and with the atmosphere to establish differential pressures on opposite faces of the piston, including controlling valve mechanism, electro-magnetic devices for operating said valve mechanism, means for connecting the actuator piston with the brake mechanism of the vehicle, a pivoted pedal lever, operatively connected with the brake mechanism of the vehicle, a pedal mounted on said lever for operating the same and movable relatively with respect to the lever, and electric connections between the said pedal and said electro-magnetic devices operable by the relative movement of the pedal with respect to said lever, a retracting spring interposed between said pedal and said pedal lever.

13. In an automotive vehicle, provided with an internal combustion engine for propelling it, having a suction passage for explosive charges from the carburetor between the throttle valve and the cylinders thereof, and brake mechanism for the vehicle, the combination of a power actuator comprising a cylinder and a piston therein, means for connecting said actuator with said suction passage and with the atmosphere to establish differential pressures on opposite faces of the piston, including controlling valve mechanism, electro-magnetic devices for operating said valve mechanism, means for connecting the actuator piston with the brake mechanism of the vehicle, a pivoted pedal lever, operatively connected with the brake mechanism of the vehicle, a pedal mounted on said lever for operating the same and movable relatively with respect to the lever, electric connections between the said pedal and said electro-magnetic devices operable by the relative movement of the pedal with respect to the lever, and means for maintaining said electric connections in inoperative condition when the pedal lever is in retracted position.

In testimony whereof we affix our signatures.

CALEB S. BRAGG.
VICTOR W. KLIESRATH.